(12) United States Patent
Julian

(10) Patent No.: US 10,450,211 B1
(45) Date of Patent: Oct. 22, 2019

(54) AERATION SYSTEM FOR WATER WELL

(71) Applicant: Keith Julian, Troy, MP (US)

(72) Inventor: Keith Julian, Troy, MP (US)

(*) Notice: Subject to any disclaimer, the term of this patent is extended or adjusted under 35 U.S.C. 154(b) by 220 days.

(21) Appl. No.: 15/280,523

(22) Filed: Sep. 29, 2016

Related U.S. Application Data

(60) Provisional application No. 62/234,484, filed on Sep. 29, 2015.

(51) Int. Cl.
| | |
|---|---|
| *E21B 21/14* | (2006.01) |
| *C02F 1/74* | (2006.01) |
| *E21B 43/12* | (2006.01) |
| *E21B 34/06* | (2006.01) |
| *E03B 3/12* | (2006.01) |
| *E03B 5/06* | (2006.01) |
| *C02F 103/06* | (2006.01) |

(52) U.S. Cl.
CPC ............... *C02F 1/74* (2013.01); *E03B 3/12* (2013.01); *E03B 5/06* (2013.01); *E21B 34/06* (2013.01); *E21B 43/121* (2013.01); *C02F 2103/06* (2013.01); *C02F 2303/02* (2013.01)

(58) Field of Classification Search
CPC ...... E21B 43/122; E21B 21/14; E21B 43/166; E21B 43/168
See application file for complete search history.

(56) References Cited

U.S. PATENT DOCUMENTS

| | | | |
|---|---|---|---|
| 2,669,440 A | 2/1954 | Lindenberg | |
| 3,649,532 A | 3/1972 | McClean | |
| 4,105,721 A | 8/1978 | Schliebe | |
| 4,400,271 A | 8/1983 | Lunceford | |
| 4,405,291 A * | 9/1983 | Canalizo | F04B 47/08 |
| | | | 417/393 |
| 4,478,765 A | 8/1984 | Tubbs | |
| 4,582,610 A | 8/1986 | Baker | |
| 4,624,626 A | 11/1986 | Sherfinski | |
| 5,073,310 A | 12/1991 | Ramsey | |
| 5,096,580 A | 3/1992 | Auschencloss | |
| 5,169,567 A | 12/1992 | Daugherty | |
| 5,725,759 A | 3/1998 | Schlafer | |
| 6,627,070 B1 | 9/2003 | Frank | |
| 7,048,861 B2 | 5/2006 | Beretta | |
| 7,942,198 B2 | 5/2011 | Zirkle | |

* cited by examiner

*Primary Examiner* — Catherine Loikith
(74) *Attorney, Agent, or Firm* — Linda L Lewis; CreatiVenture Law

(57) ABSTRACT

A system and a method of aerating well water using an aeration system comprising a well water drop pipe approximately vertically positioned having a bottom end in a well below the pumping level of the well water. Attached to the bottom end of the pipe is a submersible water pump, and a limited check valve is fluidly attached above the water pump. A flow restrictor is fluidly attached above the limited check valve to limit the flow of water up the pipe, and above the flow restrictor or the check valve is fluidly attached a bleeder to allow air to flow into the pipe when negative pressure is in the pipe. Above the bleeder is fluidly attached at least one check valve to prevent flow of water back to the bleeder.

16 Claims, 3 Drawing Sheets

AERATION SYSTEM FOR WATER WELL

CROSS-REFERENCE TO RELATED APPLICATIONS

This application claims the benefit of provisional patent application No. 62/234,484 filed on Sep. 29, 2015, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

Technical Field

The present invention relates to a system for removing certain contaminants or impurities from well water by oxidation and off-gassing through the introduction of air into the well water without the use of an air pump or venturi.

BACKGROUND ART

It is well known that water drawn from wells usually contains a variety of impurities or contaminates. The usual contaminates occurring naturally in well water are calcium, iron, sulfur and manganese, although many man-made contaminates are now also found. These mineral contaminates may cause stained plumbing fixtures and corroded pipes and in addition, may result in the presence of disagreeable odors and improper taste to the water.

Undesirable mineral content is removed from raw water by a variety of methods, although most of the methods involve treatment of the water with oxidizing substances. For example, removal of iron and manganese is commonly effected by running the water through a filter with a bed of minerals periodically regenerated with a chemical such as potassium permanganate to oxidize the dissolved metals forming either oxides or hydrates which are precipitated and removed in the filter. Another method that is widely used is that of injecting a quantity of oxygen, either as pure oxygen or more commonly in the form of air. Possibly the most widely accepted method for introducing air into well water is by means of air aspiration produced through use of a venturi orifice. Of a somewhat more limited use has been the direct injection of air under pressure into a body of water to provide the oxygen necessary to oxidize the metal ions for ultimate removal from the water.

A system illustrating the use of air aspiration to precipitate iron is shown in U.S. Pat. No. 5,096,580. In this arrangement, well water is drawn by means of a pump through a pipe and into a pressure tank. From that point, the water ultimately is directed, upon a demand basis to an oxygen induction device, which is in fact a venturi jet that aspirates air into the water at that point. The induction of air created by the venturi orifice is located close to the filter tank so that buildup of precipitated iron oxide or iron hydrates is prevented from occurring in the pipe.

In U.S. Pat. No. 3,649,532, water enters through an inlet and is passed through a venturi type air aspirator unit where it then continues to flow through a valve and to an inlet tube which is located on the interior of a filter tank. An automatic air release is provided in the upper portion of the tank to vent air and sulfur containing gases to the exterior. One problem encountered with this type of system results from the fact that the incoming air/water mixture are present together for a comparatively short time before being released into the interior of the tank and oxidation of the dissolved metal content is often inadequate to effect good cleansing of the well water.

A different sort of system is shown in U.S. Pat. No. 4,749,493. In this instance, an oxygen supply is introduced into the bottom of a column which contains a plurality of rings. The interior of the column is first filled with an oxygen supply and then water flows upwardly through a tube, exiting through a screen. The water then percolates downwardly through the rings acquiring oxygen from the oxygen enriched environment that had been initially placed in the column from the oxygen supply. In this apparatus, the oxygenated water is withdrawn through the discharge ports located in the bottom portion of the column. U.S. Pat. No. 4,695,378 shows an apparatus used for the purpose of treating acid mine water and involves the use of a pair of jet pumps using a venturi effect to provide aeration of the water. Following introduction of water through aspiration, the flow is then into a static mixer which has a helical interior that swirls the water and air to provide some additional mixing of the air and water. This aspiration describes a process for introducing air into acid mine water and performing a mechanical mixing operation but does not deal with the ultimate use of water for consumer use. Other related patents are U.S. Pat. Nos. 3,649,533, 4,534,867, 4,659,463, 5,061,377, 5,096,596 and 5,147,530.

While the processes that constitute the prior art recognize the use of air or oxygen introduction into water, for certain purifications, problems still exist. For example with systems utilizing venturi aspiration of air into water, the venturi devices can be difficult to maintain and to obtain the introduction of sufficient quantities of air into the water to effect complete oxidation of dissolved mineral elements. The venturi is a flow restrictor which limits water pressure to the end user or adds a load on the well pump. When oxidation does occur, depending upon the location where the air is aspirated, precipitation of mineral elements from solution can occur which can result in blockage and constriction of conveying pipes or the venture itself. In systems using air injection, unremoved excess air creates blockages and noises in plumbing systems.

The apparatus of the present invention provides an efficient, economical apparatus and system for dissolving substantial quantities of air (oxygen) into well water and also for removing excess oxygen that would otherwise result in transport difficulties. In addition, the present system insures that there is maximum physical interaction between the oxygen bearing air and the water so that thorough aeration of the water is accomplished to oxidize the maximum amount of dissolved mineral content.

Most prior art devices either have weaknesses which include failing to aerate effectively, or a malfunctioning venturi. There is no prior art device that does what the present invention does. Examples of known prior art devices are described in U.S. Pat. Nos. 4,400,271, 4,478,765, 4,582, 610, 4,624,626, which are hereby incorporated by reference.

SUMMARY OF THE INVENTION

A method of aerating well water using an aeration system comprising a well water pipe approximately vertically positioned having a bottom end in a well below the pumping level of the well water. Attached to the bottom end of the pipe is a submersible water pump to pump the well water up the pipe. Above the water pump a limited check valve is fluidly attached, and the limited check valve has a small opening in the poppet to allow some water to flow back down the drop pipe and through the pump. This limited check valve operates in a normal manner when the pump is running. Above the limited check valve is fluidly attached a flow restrictor to limit the flow of water up the pipe. In an alternate embodiment the flow restrictor is above the pump, and the limited check valve is above the flow restrictor. Above the flow restrictor or the check valve is fluidly attached a bleeder to allow air to flow into the pipe when negative pressure is in the pipe, and above the bleeder is fluidly attached at least one check valve to prevent flow of water back to the bleeder. This check also keeps the water above it in the pipes and pressure tank from flowing back down the drop pipe and into the well. The water pump, the limited check valve having an opening and the flow restrictor are immersed in the well water below the pumping level of the well water, and the bleeder and the at least one check valve are above the static level of the well water. When the pump is turned on, water flows up through the pipe, the limited check valve opening, the flow restrictor, and the check valve. When the pump is turned off, the water in the pipe drops down below the check valve, and air enters the pipe through the bleeder filling the pipe with air between the check valve and the static level of water. When the pump is turned on again, the air is pushed up by the water in the pipe, through the check valve, thereby aerating the well water without an air pump.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
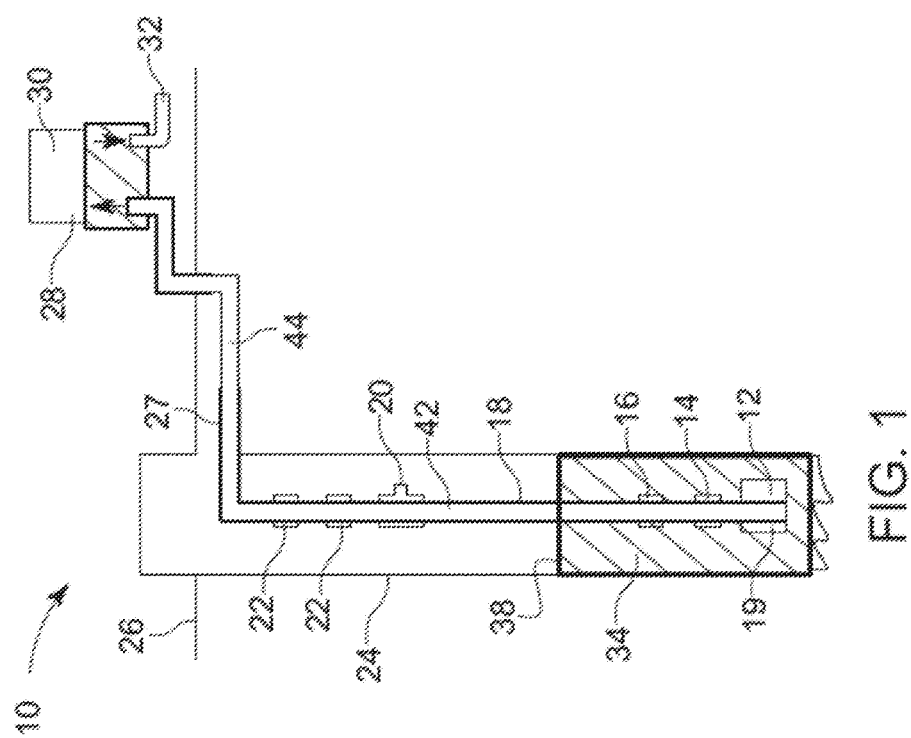
FIG. 1 is the aeration system with the pump turned on and the water level at the pumping level.

The present invention is directed to a well water aeration system 10 which does not use an air pump or a venturi, and a method of using the system. The system is embodied in FIGS. 1, 2 and 3. In FIG. 1, a well water drop pipe 18 having a bottom end 19 approximately vertically positioned in a well below the pumping level 38 of the well water 34. The well water drop pipe 18 can be PVC or galvanized pipe, and is typically from 1 to 2 inches in diameter. Attached to the bottom end of the pipe is a water pump 12 to pump the well water up the pipe and above the water pump is fluidly attached a limited check valve 14 which has a small opening in the poppet to allow some water to flow back through the pump. A typical domestic water pump will pump from about 5 to 15 GPM. The check valve 14 has a small hole in the poppet, from about 1/16 to 1/4 inch in diameter. A preferred hole is about 1/8 inch in diameter.

Figure 2:
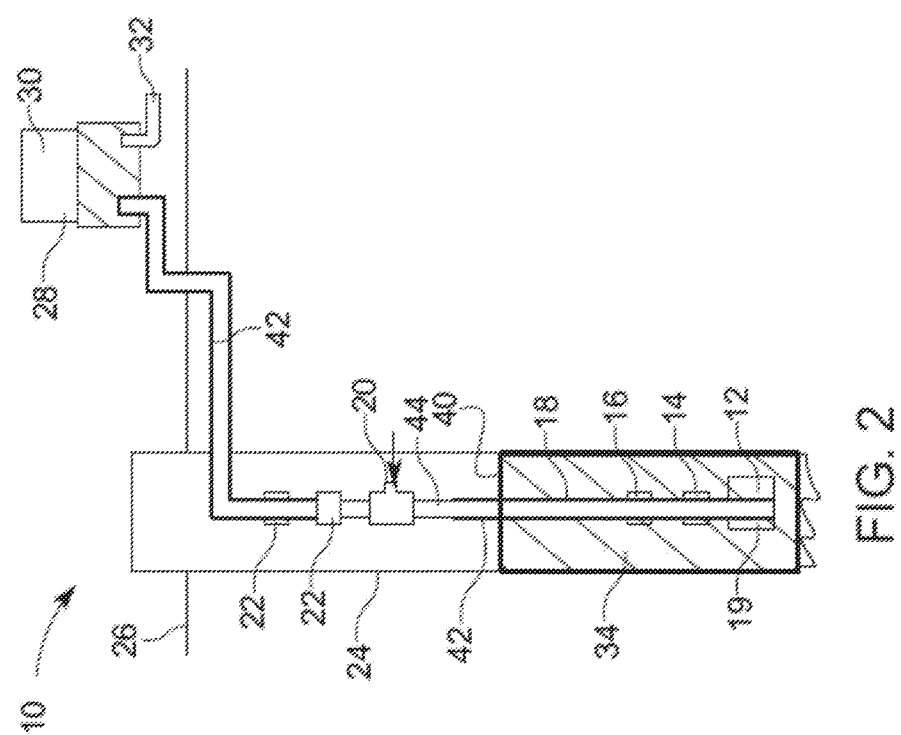
FIG. 2 is the aeration system immediately after the pump is turned off and before the water level rises to the static level, and the water level is at the intermediate level.
Figure 3:
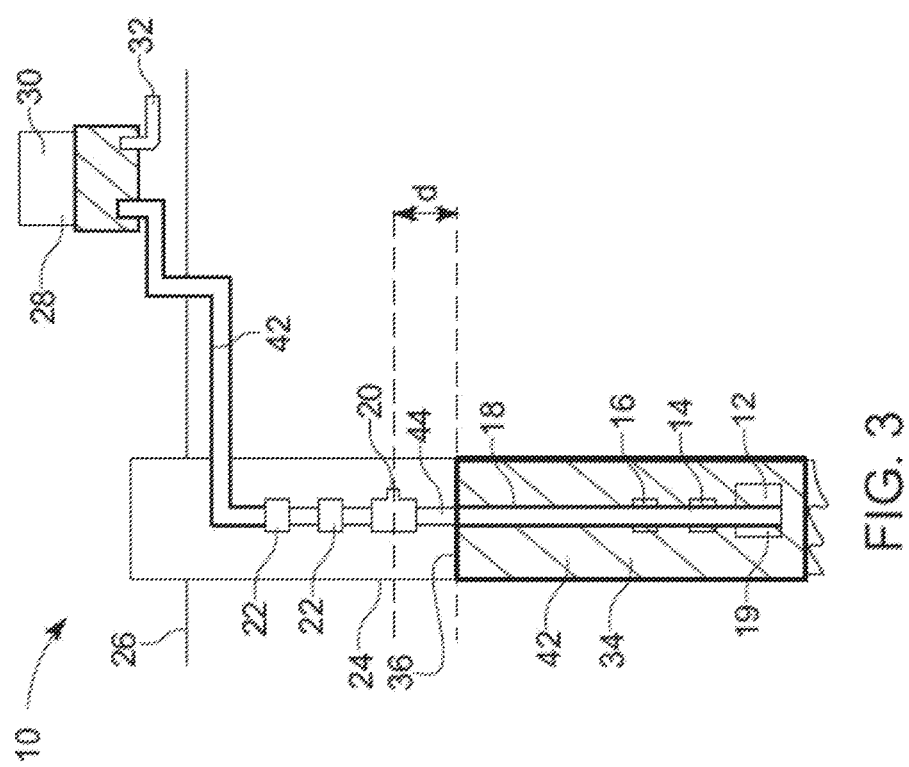
FIG. 3 is the aeration system with the pump turned off and the water level at the static level.

Above the check valve is fluidly attached a flow restrictor 16 to limit the flow of water up the pipe. This is needed because a submersible pump is designed to start under a load and/or a maximum gallons per minute. The load specification is the minimum pressure and/or the maximum gallons per minute the pump manufacturer recommends. The load specification will vary depending on the pump. In the prior art, the load specification is met because all the pipes contain water and no air at all times. When the pump starts, it pumps against the head of water above the static level, plus any tank pressure. For the present invention, the pump starts with air in the pipe, and must compress the air to create pressure to pump against. The hole in the restrictor is sized to create pressure and restrict the flow. This will keep the pump operating within the manufacturer's recommendations when the pump starts and until the air in the drop pipe is sufficiently compressed. The flow restrictor can be made from a pipe nipple of any diameter, but is preferably a 1¼×12 inch stainless steel nipple. A partition is placed in the nipple with a hole sized according to the size of the water pump. In a preferred embodiment, the hole is about 0.25 inch or larger. As shown in FIG. 2, fluidly attached above the flow restrictor on the pipe is a bleeder 20 to allow air 44 to enter the drop pipe 18 when the pump turns off. As shown in FIG. 3, in a preferred embodiment, the bleeder is mounted on a pipe tee, and is mounted above the static water level 36. The bleeder needs to be mounted above the static water level 36 a sufficient distance (d) to provide sufficient air in the pipe to oxidize the water impurities and remove the undesirable odors. Preferably, the bleeder 20 is mounted about 20 feet or less above the static water level. Greater than about 20 feet above the static water level results in the pumped aerated water coming out of the tank with a cloudy appearance due to entrained air bubbles. The bubbles dissipate after sitting a few minutes, but the effect is undesirable. A preferred range of mounting the bleeder 20 above the static water level is from about 5 to 20 feet. In a more preferred embodiment, the bleeder is mounted in the range of from about 10 to 20 feet above the static water level. Above the bleeder is at least one check valve 22 to prevent flow of water that has been pumped up into the pressure tank and pipes back down to the well. Two or more check valves 22 can be mounted above the bleeder as to provide check valve backups.

The minimum distance between the bleeder and the lower check valve 22 is at least about 10 feet, and preferably about 20 feet. This minimum distance is needed to provide enough air pumped into the pressure tank to adequately aerate it. When the pump starts, the bleeder, if not working correctly, can let out too much air. This minimum distance between the bleeder and the check valve 22 insures that some air is pumped into the system every time the pump starts The water pump, the limited check valve having an opening and the flow restrictor are immersed in the well water 34 below the pumping level 38 of the well water, and the bleeder and the at least one check valve are above the static level of the well water. As shown in FIG. 1, when the pump is turned on, water 42 flows up through the pipe, the check valve having an opening, the flow restrictor, and rises to the lower check valve 22. As is shown in FIG. 2, immediately after the pump is turned off, the water level is at a transition level 40, as the water in the drop pipe 18 below the check valve 22 drops down. As shown in FIG. 3, after some time that the pump is turned off, the water in the pipe drops down below the check valve 22, and air enters the pipe through the bleeder because of the negative pressure filling the pipe with air between the check valve 22 and the static level 36 of water. When the pump is turned on again, the air 44 is pushed up by the water in the pipe, through the check valve, thereby aerating the well water without an air pump or venturi.

The well drop pipe 18 is held inside the well casing 24. Typically the well casing is from about 4 to 6 inches in diameter. The well pipe extends from the pump to a water tank 28, fluidly connected by a pipe 27 which travels essentially horizontally, and is preferably buried below ground level 26 sufficiently deep that the water won't freeze in the pipe during the winter.

The tank 28 is a pressure tank, without a bladder or a diaphragm. The tank can be galvanized metal, epoxy coated or fiber glass. Installed on the tank 28 is an air volume control device 30. Preferably the device 30 is installed near the middle of the tank. The device 30 senses the rising and lowering water level and at a predetermined setting, vents excess air from the tank. This is a critical part of the present invention, as air as well as water is pumped into the tank, and the excess air needs to be vented. The tank has a second pipe 32 which is used to carry water away from the tank to the desired location.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A well water aeration system comprising:
   a drop pipe positioned approximately vertically in a water well;
   wherein the drop pipe has a bottom end;
   wherein the water well contains well water;
   wherein attached to the bottom end of the drop pipe is a submersible pump immersed in the well water to pump the well water into and up the pipe;
   wherein the well water in the well has a pumping level when the pump is turned on and a static level when the pump is turned off;
   wherein a bleeder is fluidly connected above the pump by the drop pipe;
   wherein at least one check valve is fluidly connected by the drop pipe above the bleeder to prevent the flow of aerated water back down the drop pipe and into the well;
   wherein the bleeder allows air to flow into the drop pipe when the pump is turned off thereby creating negative air pressure;
   wherein the bleeder and the at least one check valve are above the static and the pumping levels of the well water in the well; and
   wherein the well water system does not have an air pump.

2. The well water aeration system of claim 1, further comprising the bleeder located on the drop pipe a distance of about 20 feet or less above the static level in the water well.

3. The well water aeration system of claim 2, further comprising the bleeder located on the drop pipe a distance of from about 5 feet to about 20 feet above the static level in the water well.

4. The well water aeration system of claim 3, further comprising the bleeder located on the drop pipe a distance of from about 10 to about 20 feet above the static level in the water well.

5. The well water aeration system of claim 1, further comprising an approximately horizontal pipe is fluidly attached to the vertical drop pipe and is fluidly attached to a water pressure tank.

6. The well water aeration system of claim 1, further comprising an air volume control attached to the water pressure tank to vent air.

7. A method of creating clear aerated well water in a water well using an aeration system, the method comprising:
   a drop pipe approximately vertically positioned in the water well;
   wherein the drop pipe has a bottom end;
   wherein the water well contains the well water;
   wherein attached to the bottom end of the drop pipe is a submersible water pump to pump the well water up the drop pipe;
   wherein the well water in the water well has a pumping level when the pump is turned on and a static level when the pump is turned off;
   wherein a limited check valve having an opening to allow some well water to flow back through the pump and/or a flow restrictor to limit the flow of well water up the pipe is fluidly connected above the pump by the drop pipe;
   wherein a bleeder is fluidly connected above the limited check valve and/or flow restrictor by the drop pipe to allow air to flow into the pipe;
   wherein at least one check valve is fluidly connected above the bleeder by the drop pipe to prevent flow of water back down the drop pipe and into the well;
   wherein the pump, the limited check valve having an opening and/or the flow restrictor are immersed in the well water below the pumping level of the well water, and the bleeder and the at least one check valve are above the static and the pumping levels of the well water; the method comprising:
   turning on the pump to pump the well water causing it to flow up through the drop pipe, the limited check valve having an opening, the flow restrictor and the at least one check valve;
   turning off the pump to cause the water in the pipe below the at least one check valve to drop thereby creating negative air pressure;
   filling the drop pipe with air through the bleeder between the at least one check valve and the static level of water; and
   pumping the well water a second time, causing the air to be pushed up by the well water in the drop pipe, through the at least one check valve, thereby aerating the well water;
   wherein the well water system does not have an air pump.

8. The method of aerating well water of claim 7, further comprising the bleeder located on the drop pipe a distance of about 20 feet or less above the static level in the water well.

9. The method of aerating well water of claim 8, further comprising the bleeder located on the drop pipe a distance of from about 5 feet to about 20 feet above the static level in the water well.

10. The method of aerating well water of claim 9, further comprising the bleeder located on the drop pipe a distance of from about 10 to about 20 feet above the static level in the water well.

11. The method of aerating well water of claim 7, further comprising an approximately horizontal pipe is fluidly attached to the vertical drop pipe and is fluidly attached to a water pressure tank.

12. The method of aerating well water of claim 7, further comprising an air volume control attached to the water pressure tank to vent air.

13. A well water aeration system comprising:
a drop pipe approximately vertically positioned in a water well;
wherein the drop pipe has a bottom end;
wherein the water well contains well water;
wherein connected to the bottom end of the drop pipe is a water pump to pump the well water up the pipe;
wherein the well water in the water well has a pumping level when the pump is turned on and a static level when the pump is turned off;
wherein above the pump is fluidly connected a limited check valve having an opening to allow some water to flow back through the pump and/or a flow restrictor to limit the flow of water up the drop pipe;
wherein above the limited check valve and/or the flow restrictor is fluidly connected by the drop pipe to a bleeder to allow air to flow into the drop pipe;
wherein above the bleeder is fluidly connected by the drop pipe at least one check valve to prevent flow of water back down the drop pipe and into the well, and to allow air to flow into the drop pipe when the pump is turned off thereby creating a negative air pressure;
wherein the water pump, the limited check valve having an opening and the flow restrictor are immersed in the well water below the pumping level of the well water and the bleeder and the at least one check valve are above the static and the pumping levels of the well water;
wherein an approximately horizontal pipe is fluidly attached to the vertical drop pipe and is fluidly attached to a water pressure tank; and
wherein attached to the water pressure tank is an air volume control to vent air; and
wherein the well water system does not have an air pump.

14. The well water aeration system of claim 13, further comprising the bleeder located on the drop pipe a distance of about 20 feet or less above the static level in the water well.

15. The well water aeration system of claim 14, further comprising the bleeder located on the drop pipe a distance of from about 5 feet to about 20 feet above the static level in the water well.

16. The well water aeration system of claim 15, further comprising the bleeder located on the drop pipe a distance of from about 10 to about 20 feet above the static level in the water well.

* * * * *